(12) United States Patent
Schwartz et al.

(10) Patent No.: US 12,291,169 B2
(45) Date of Patent: May 6, 2025

(54) AUTOMATIC TRIGGER STRATEGY FOR CLEARING EXTERIOR BIOMETRIC SENSORS

(71) Applicant: FORD GLOBAL TECHNOLOGIES, LLC, Dearborn, MI (US)

(72) Inventors: Jake S. Schwartz, Dearborn, MI (US); John R. Van Wiemeersch, Novi, MI (US); David A. Hiskens, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 308 days.

(21) Appl. No.: 17/968,895

(22) Filed: Oct. 19, 2022

(65) Prior Publication Data
US 2024/0132020 A1 Apr. 25, 2024
US 2024/0227734 A9 Jul. 11, 2024

(51) Int. Cl.
B60R 25/25 (2013.01)
B60R 25/20 (2013.01)
(Continued)

(52) U.S. Cl.
CPC .......... *B60R 25/252* (2013.01); *B60R 25/209* (2013.01); *B60R 25/245* (2013.01); *B60R 25/305* (2013.01); *B60S 1/026* (2013.01); *B60S 1/56* (2013.01); *G01K 3/005* (2013.01); *G06V 20/58* (2022.01); *G06V 40/13* (2022.01)

(58) Field of Classification Search
CPC ... B60R 25/252; B60R 25/209; B60R 25/245; B60R 25/305; B60R 16/023; B60S 1/026; B60S 1/56; B60S 1/60; G01K 3/005; G06V 20/58; G06V 40/13
USPC ......... 701/36, 2, 1, 113, 93, 33.9, 34.3, 523, 701/423, 10, 123; 340/5.82, 901, 870.17, 340/539.27, 589, 581
See application file for complete search history.

(56) References Cited

U.S. PATENT DOCUMENTS 10,640,137 B2 5/2020 Ostrowski et al.
11,001,231 B1 5/2021 Hedman et al.
(Continued)

FOREIGN PATENT DOCUMENTS

DE 102013011186 A1 1/2014

*Primary Examiner* — Anne Marie Antonucci
*Assistant Examiner* — Jodi Jones
(74) *Attorney, Agent, or Firm* — Frank L. Lollo; MacMillan, Sobanski & Todd, LLC

(57) ABSTRACT

While a vehicle is off, an automatic trigger strategy activates a heating device that melts snow and ice off exterior vehicle sensors as it is needed. The automatic trigger strategy determines when to turn on the heating device while the vehicle is in a limited power state by using data pulled from memory or data obtained from a current data check. Collected, analyzed, and stored during key-off, data pulled from memory allows the invention to accurately choose the correct time to start the heating device without consuming additional power. If current data checks are required because data saved at key-off is not enough information to execute a decision, the invention may determine the least power consuming data checks. A power manager extends a threshold that is dependent on the energy reserve. Once the energy reserve is below the threshold, the power manager inactivates the heating device and voids manual commands.

19 Claims, 4 Drawing Sheets

(51) Int. Cl.
*B60R 25/24* (2013.01)
*B60R 25/30* (2013.01)
*B60S 1/02* (2006.01)
*B60S 1/56* (2006.01)
*G01K 3/00* (2006.01)
*G06V 20/58* (2022.01)
*G06V 40/13* (2022.01)

(56) References Cited

U.S. PATENT DOCUMENTS

| | | |
|---|---|---|
| 11,320,165 B2 | 5/2022 | Venkatesh et al. |
| 2004/0021575 A1* | 2/2004 | Oskorep .................. B60S 1/66 |
| | | 219/205 |
| 2012/0047929 A1* | 3/2012 | Delorme ................ B60S 1/026 |
| | | 62/155 |
| 2017/0136961 A1* | 5/2017 | Harada ................... B60R 11/04 |
| 2017/0253201 A1* | 9/2017 | Maeshiro ............... H04N 23/20 |
| 2020/0279445 A1* | 9/2020 | Min ..................... G06V 10/143 |
| 2020/0391576 A1* | 12/2020 | Ostrowski ............... B60J 1/002 |
| 2021/0312027 A1* | 10/2021 | Zou ....................... G06V 40/45 |

* cited by examiner

AUTOMATIC TRIGGER STRATEGY FOR CLEARING EXTERIOR BIOMETRIC SENSORS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

A biometric sensor may be mounted on a vehicle to detect an identity corresponding to an authorized user of the vehicle for use in keyless entry systems or other vehicle systems. These sensors may be subject to environmental elements including ice and snow that degrade feature performance or inhibit it completely by obscuring an exterior side of the sensor. This feature performance can be restored by applying heat to melt or remove the ice or snow in the vicinity of the sensors. Availability of the sensor at the time the user approaches and attempts to access the vehicle may depend on initiating the heating prior to the attempt. Continuous monitoring of a sensor for obscuring ice and snow and immediately applying heat to remove it may be impractical due to the associated power drain. Especially since the vehicle may be in a limited power state (e.g., when the vehicle is off and depends only on a storage battery). Even intermittent monitoring and/or collection and processing of various kinds of data to predict future conditions and the times when a user may approach the vehicle has been impractical due to the power drain on the limited battery capacities. Establishing and applying the heat as needed may be achieved more reliably with more available data. However, increased data collection leads to more power consumed.

A heating device proximate to the biometric sensors may be activated before the user arrives to maintain or return the feature performance of the biometric sensors when a user is ready to enter the vehicle. An automatic trigger may start the heating device without the instruction of the user and before the user desires to unlock the vehicle. However, an automatic trigger may waste scarce vehicle power. Applying heat too early or for too long a period could leave the vehicle powerless, unable to start. Power consumption should be considered when applying this heat to prevent battery drain and to maximize vehicle driving range.

SUMMARY OF THE INVENTION

In one aspect of the invention, a data acquisition system is configured to collect data that determines whether to activate a heating device. Baseline data is collected via the data acquisition system when the vehicle enters a key-off state, and other current data is collected when the vehicle is off. The baseline data collected by the data acquisition system may include identifying a parking status of the vehicle as indoor or outdoor, measuring an ambient exterior temperature at the vehicle, and collecting a weather forecast applying to an area where the vehicle is located. Baseline data may be acquired before the vehicle fully turns off (e.g., while power is still being generated by an internal combustion engine, hybrid generator, or active charging).

While the vehicle is parked, a controller determines whether to activate the heating device based on the collected data. The controller uses a set of rules to trigger the heating device in a manner which is intended to minimize power consumption by prioritizing data collection according to factors which are obtainable with low power utilization and which are capable of leading to a definitive determination (e.g., able to eliminate the possibility that heating would be needed).

A first rule may leave the heating device inactivated if the parking status is identified as indoor. A second rule may leave the heating device inactivated if the ambient exterior temperature is above a predetermined threshold. A third rule may leave the heating device inactivated if the weather forecast indicates a probability of snow or ice less than a threshold (which may include an instance when the weather forecast predicts a temperature rise sufficiently above freezing to occur by the time the user is expected to access the vehicle). In a preferred embodiment, processing of the rules can be terminated after any rule determines that the heating device should be left off. If the prior rules do not leave the heating device inactivated, then a fourth rule may activate the heating device in response to a user activity. User activity may include (1) a current time matching an estimated time at which a user is expected to access the vehicle, (2) detection that a wireless key carried by the user is nearby, or (3) reception of a remote start command. Additional rules may utilize cameras to detect ice and snow obscuring a biometric sensor. A power manager may be used to deactivate the heating device when the remaining power of the vehicle is below a threshold.

DETAILED DESCRIPTION OF PREFERRED EMBODIMENTS

Figure 1:
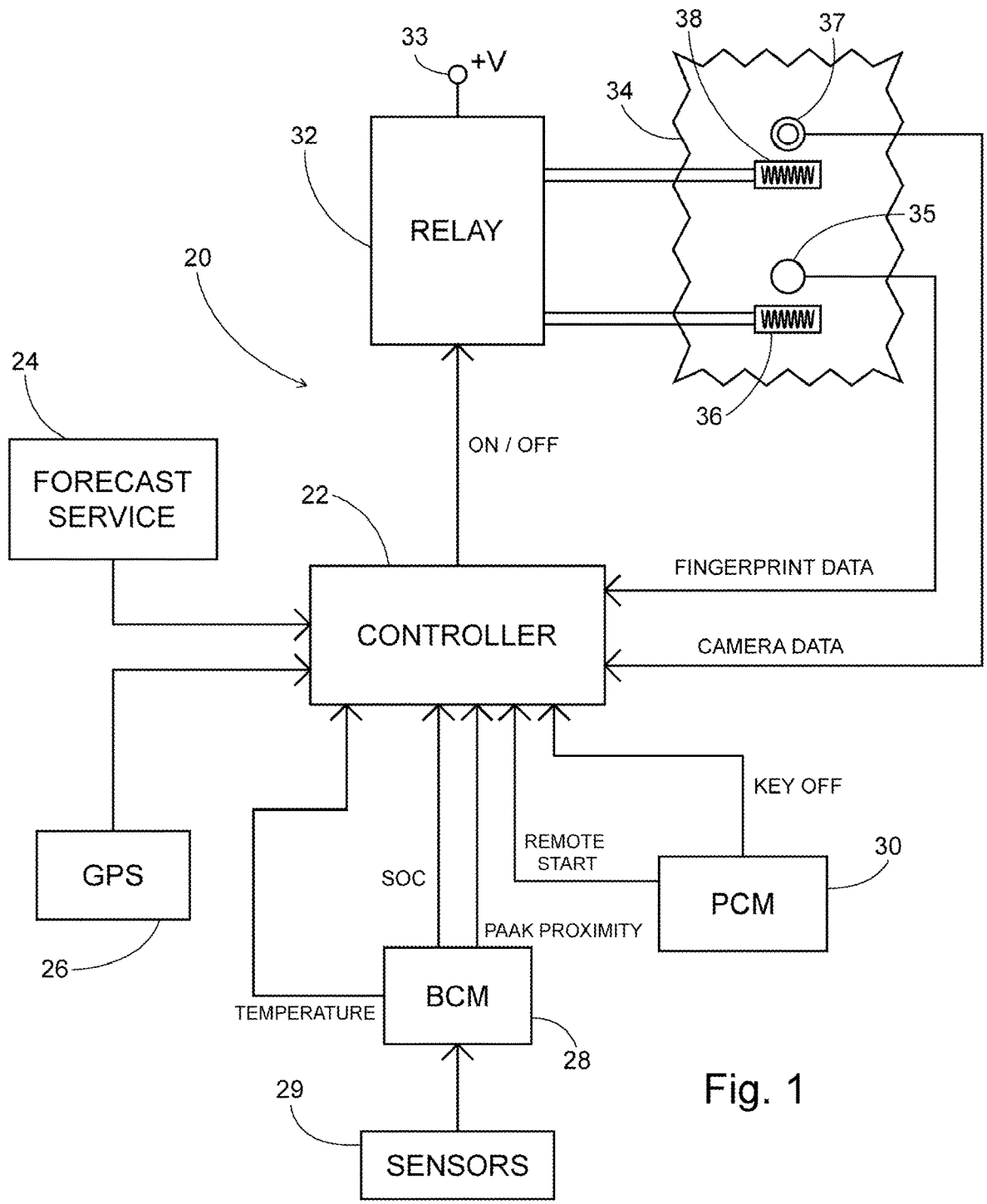
FIG. 1 is a block diagram showing a vehicle according to one preferred embodiment.

FIG. 1 shows one embodiment of a vehicle 20 configured to utilize data to determine the need for heat to clear ice or snow from covering exterior sensors while the vehicle is off. Weather forecast service receiver 24, GPS receiver 26, sensors 29, a powertrain control module (PCM) 32, and biometric sensors 35 and 37 all provide data to a controller 22. A body control module (BCM) 28 is coupled to various vehicle electronics such as sensors 29, and provides ambient temperature measurements, battery state of charge (SOC) measurements, and Phone-as-a-Key (PaaK) proximity data to controller 22. PCM 30 informs the controller of when the vehicle is entering key-off and provides a signal to indicate when a remote start command has been received. Biometric sensor 35 is a fingerprint scanner, located near a vehicle body 34, providing fingerprint data to controller 22. Sensor 35 can use ultrasonic, capacitive, thermal, or optical sensing to acquire fingerprints. Biometric sensor 37 is a camera, located near vehicle body 34, providing image data to controller 22. Sensor 37 can be a specialized camera for capturing facial, iris, gait, or other biometric attributes.

Controller 22 is configured to determine a need for activating heating devices associated with biometric sensors 35 and 37 when they may be obscured by ice or snow. If heat is desired, controller 22 activates a relay 32 (e.g., a conventional electromechanical relay, solid-state relay, or solid-state pass control circuit). Relay 32 couples electrical power from a source 33 in order to activate heating devices 36 and 38 located proximate to biometric sensors 35 and 37. Heating devices 36 and 38 may be comprised of positive temperature coefficient (PTC) heaters or other electrical resistance heaters, for example.

Figure 2:
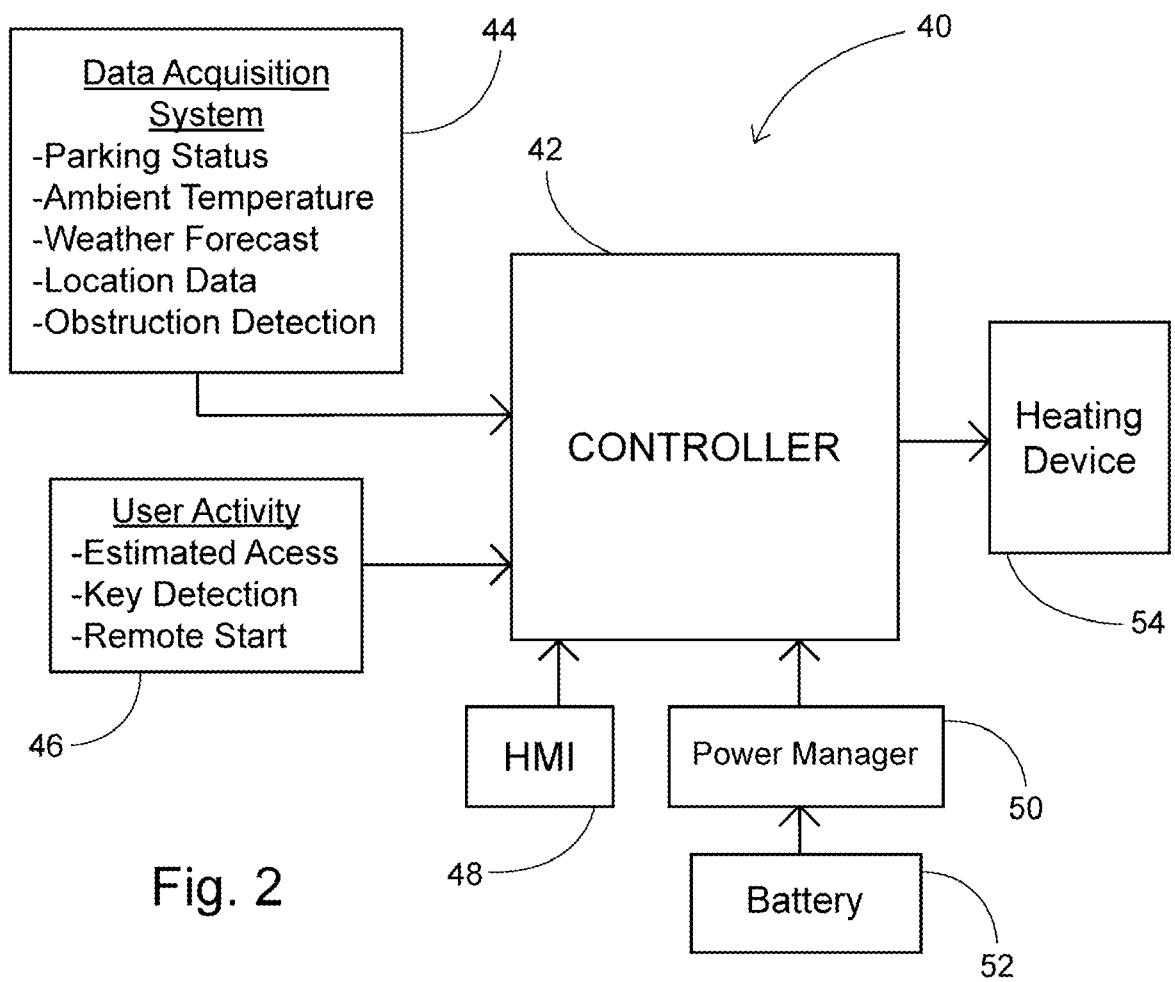
FIG. 2 is a block diagram showing a vehicle according to one preferred embodiment.

FIG. 2 shows another embodiment wherein a vehicle 40 includes a data acquisition system 44, a user activity monitor 46, a human machine interface (HMI) 48, and a power manager 50 coupled to a controller 42. Data acquisition system 44 is configured to provide data including parking indoor/outdoor status, ambient temperature, weather forecasts, location data, vehicle orientation, and obstruction detection. At least some data may be collected at key-off, and some data may be collected in a prioritized order configured to enable judgments to be made using the lowest power consumption during times when the vehicle is off. User activity data 46 is comprised of estimated times of access, key proximity detection, and remote start requests. An estimated access time can be determined according to a user schedule (e.g., based on day of the week and past drive times relative to particular locations, such as arrival and departure times when parked at a place of work). The data acquired by data acquisition system 44 and the data attained from user activity monitor 46 is analyzed by controller 42 configured to determine the need for activation of heating device 54. HMI 48 includes user control elements (e.g., a touchscreen menu or a contact switch) to allow the user to manually activate heating device 54.

A battery 52 stores electrical power to support data collection, data processing, and heater activation, for example. Power manager 50 monitors the level of stored power in a battery 52 for comparison with a minimum reserve threshold. Power manager 50 is configured to send a signal to controller 42 when the stored power of battery 52 is below the minimum threshold. Whenever battery 52 is below the minimum threshold, controller 42 shuts down heating device 54 until the next key cycle for an ICE vehicle and until the next charge cycle for an EV.

Figure 3:
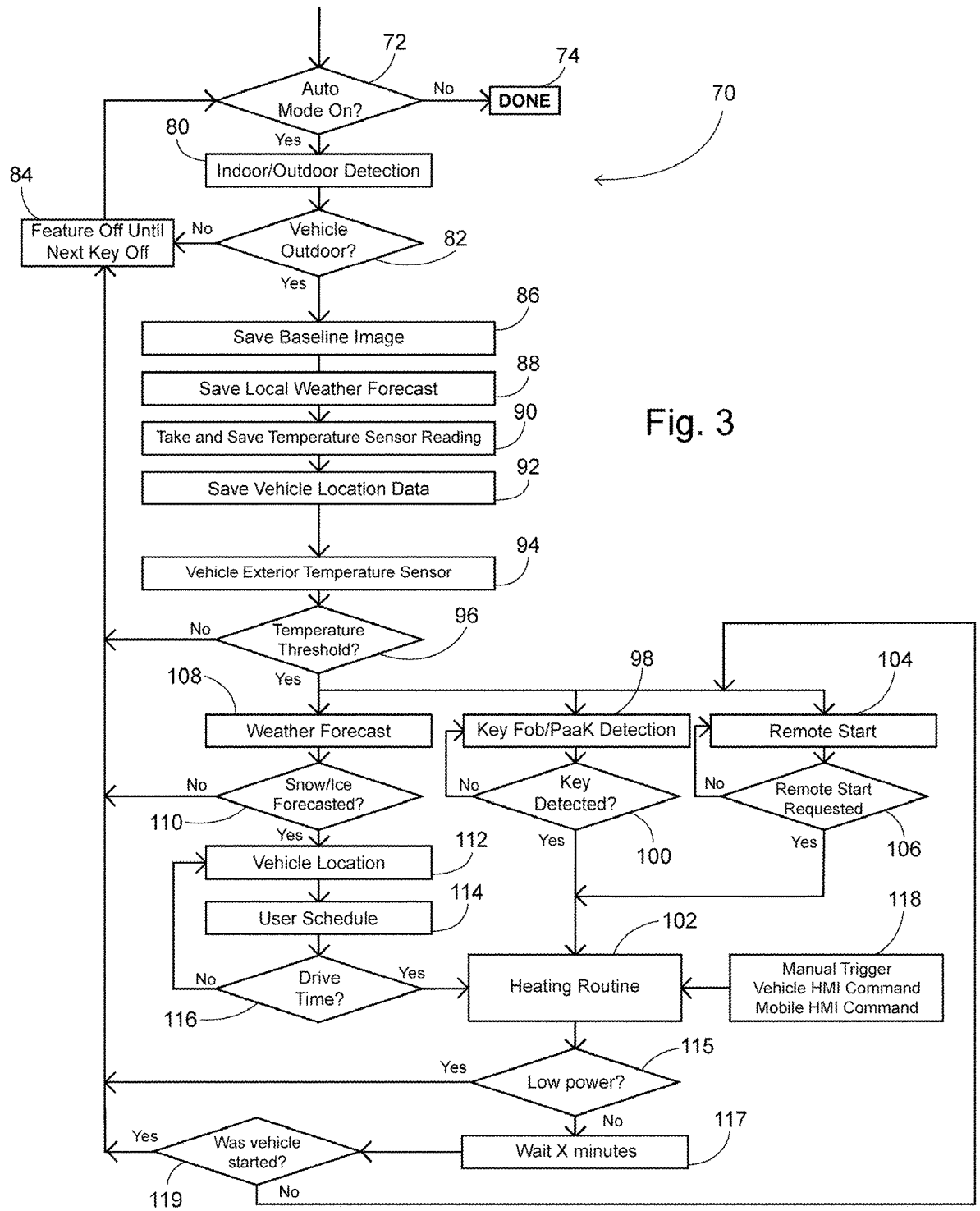
FIG. 3 is a flowchart showing a method of the invention including an automatic trigger strategy.

FIG. 3 shows a flowchart describing one preferred method 70 for a heating device activation procedure. At a key-off event, a check is performed in step 72 to determine whether an advanced automatic trigger strategy is activated. For example, the automatic trigger strategy may be unavailable if a user has not yet enrolled a biometric pattern for use in recognizing them. If the advanced automatic trigger strategy has not been activated, then the procedure is complete at step 74. If the advanced automatic trigger strategy is activated, then the parking status of the vehicle is determined to be either indoor or outdoor in step 80. When the vehicle is indoors, the formation or retention of ice or snow over a biometric sensor is unlikely and no heating should be needed. To determine the parking status, a computer vision algorithm and/or GPS data may be examined to determine if the vehicle is parked indoors (e.g., in a parking structure or garage) or outdoors. For example, GPS data may provide geographic coordinates for comparison with stored coordinates of a user's garage or with map overlays showing public parking facilities. To qualify as an indoor environment, a structure around the vehicle should insulate the vehicle from the weather enough to avoid ice or snow buildup. For example, a floor of a parking structure with open sides may be considered outdoors while an underground floor of the parking structure is considered indoors.

A check is performed in step 82 to determine whether the parking status is outdoors. If the vehicle is determined to be indoors then the heating device activation feature is deactivated until the next key OFF in step 84 and a return is made to step 72. Thus, no further checks are performed and any further power usage is avoided.

If the vehicle is determined to be outdoors, then baseline data is collected and stored. In step 86, baseline images are saved from available cameras. In step 88, a local weather forecast is saved according to GPS data or other data which determines the vehicle location. In step 90, an exterior ambient temperature measurement is taken and saved by a vehicle exterior temperature sensor. In step 92, vehicle location data is saved.

In step 96, a check is performed to determine whether the exterior ambient temperature is above a predetermined temperature threshold. The threshold is selected such that whether the vehicle is located indoors or outdoors, the ambient temperature conditions ensure that the vehicle exterior surface is sufficiently warm to keep it free of snow and ice. Thus, if the ambient temperature is determined to be above the temperature threshold, then the heating device activation feature is deactivated until the next key OFF in step 84. However, if the ambient temperature is below the temperature threshold, then there is potential for ice or snow to obscure a biometric sensor. Consequently, various kinds of user activity are then checked so that a heating device can be activated as necessary when an associated keyless entry function or other biometrically-controlled function may be needed. Different kinds of user activity can be monitored simultaneously, and three examples are shown in FIG. 3.

In step 98, the method searches for an approaching wireless vehicle key used for authorizing vehicle access such as an RF transceiver in a key fob, a PaaK device, or a paired Bluetooth device (e.g., prior to any remote unlock command in order to detect a user's approach to the vehicle within a threshold distance as early as possible). A check is performed in step 100 to determine whether an approaching key has been detected. If a key is not detected, then a return is made to step 98 to continue awaiting an approaching key. Once a key is detected, the heating routine is triggered in step 102. The heating routine clears any ice or snow around the biometric sensor(s).

In step 104, the method searches for a remote start request from an authorized user of the vehicle. If a request for a remote start of the vehicle is detected in step 106 then the heating routine is triggered in step 102.

In step 108, a local weather forecast is acquired. A check is performed in step 110 to determine whether the local weather forecast contains ice, snow, or similar elements such as frost. If these elements are not in the local weather forecast, then the heating device activation feature is deactivated until the next key OFF in step 84. However, if the local weather forecast is determined to contain ice, snow, or similar elements, then the location of the vehicle is recalled or determined in step 112 in order to attempt a prediction of a time when the user may next utilize the vehicle. This may allow the heating device to begin clearing ice or snow even before the user makes a near approach to the vehicle (with or without a wireless key). The location data may be used in step 114 to identify a regularly visited place (e.g., workplace or home) of a user for which a user schedule is stored which identifies typical arrival and/or departure times. The user schedule can be manually configured or can be built up automatically by a vehicle controller. For example, the user schedule may be a predicted schedule of drive times based on past drive times relative to past vehicle locations. A drive time is predicted when the user schedule has a high confidence that the next key cycle of the vehicle is soon to commence. A check is performed in step 116 to determine whether a current time matches a drive time in the user schedule. If it is not yet a drive time in the user schedule, then a return is made to step 112 to continue monitoring. Once a drive time in the user schedule is reached, then the heating routine is triggered in step 102.

As shown in step 118, a manual trigger can also be used to activate the heating routine. A manual activation can be triggered through a vehicle HMI command or using a mobile device (e.g., smartphone). If manually triggered, then the heating routine is activated in step 102.

In the event that after the heating routine in step 102 has been triggered and completed but the user nevertheless does not unlock/enter the vehicle (e.g., the user does not return to the vehicle at a predicted time), then the method may return to a state for monitoring user activity (via returning to step 98, 104, and 108). If, on the other hand, the heating routine is halted because of a low reserve of electrical power then a return may be made to step 84.

More specifically, when heating routine 102 ends, a check is performed in step 115 to determined whether a low power condition exists. If so, then the feature is deactivated until the next key OFF in step 84. If the low power condition does not exist, then a predetermined time delay is performed in step 117. The delay may take into account the expected number of minutes for which the area newly cleared of ice and snow can expect to remain clear. Then a check is performed in step 119 to determine whether the vehicle has been started. If not, then a return is made to execute steps 98, 104, and 108. Otherwise, the feature is deactivated until the next key OFF in step 84.

Figure 4:
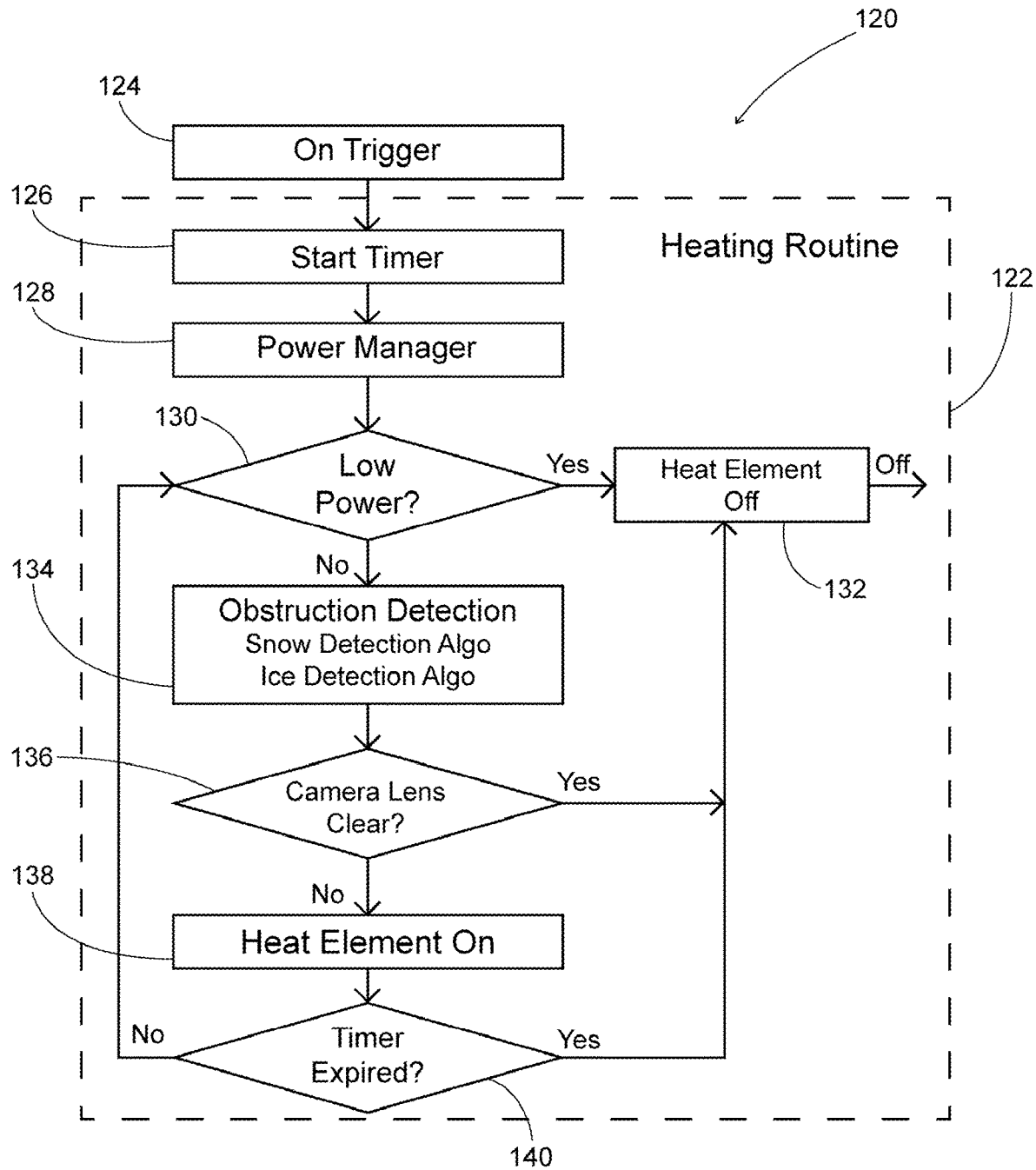
FIG. 4 is a flowchart showing a method of the invention including an automatic trigger strategy.

FIG. 4 shows a flowchart describing one preferred method 120 including a heating routine 122. In step 124, the heating routine is activated as described above. In step 126, a timer is started which is set to expire after a maximum amount of time for which the heating device(s) are allowed to operate. In step 128, a power manager senses the remaining power capacity (e.g., a battery SOC). A check is performed in step 130 to determine whether the remaining power is below a threshold. If the remaining power is below the threshold, then the heating routine ends by turning a heat element off in step 132. Once the heating routine ends, the function stays off until the next key cycle. However, while remaining power remains above the threshold, obstruction detection takes place in step 134. Obstruction detection may include ice and snow detection using an exterior camera, for example. Ice and snow may be detected using any detection algorithm such as image sharpness analysis or convolutional neural network (CNN) models configured to learn the difference between ice and snow and other camera lens obstructions. A check is performed in step 136 to determine whether the camera lens is clear. If the camera lens is clear, then the heating routine ends. However, if the camera lens is obstructed, then the heating device is activated or continues to operate in step 138. A check is performed in step 140 to determine whether the timer set in step 126 has expired. If the timer has expired, then the heating routine ends at step 132. However, if the timer is not expired, a return is made to step 130 to determine whether the remaining power is now below a threshold.

What is claimed is:

1. An apparatus for a vehicle comprising:
   a biometric device mounted on the vehicle for detecting an identity corresponding to a user of the vehicle;
   a heating device mounted proximate to the biometric device;
   a power manager configured to inactivate a data acquisition system when an energy reserve falls below a threshold;
   the data acquisition system configured to identify a parking status of the vehicle as indoor or outdoor, measure an ambient exterior temperature at the vehicle, and collect a weather forecast applying to an area where the vehicle is located;
   a controller configured to determine whether to activate the heating device, when the data acquisition system has not been inactivated, using a set of rules comprising:
   (A) collecting baseline data when the vehicle enters a key-off state;
   (B) leaving the heating device inactivated if the parking status is identified as indoor;
   (C) leaving the heating device inactivated if the ambient exterior temperature is above a predetermined threshold;
   (D) leaving the heating device inactivated if the weather forecast indicates a probability of snow or ice less than a threshold; and
   (E) activating the heating device in response to a user activity if the heating device has not been left inactivated in (A) through (D).

2. The apparatus of claim 1 wherein the user activity is comprised of an estimated time at which the user of the vehicle is expected to access the vehicle.

3. The apparatus of claim 1 wherein the user activity is comprised of a security key of the user approaching within a threshold distance of the vehicle.

4. The apparatus of claim 1 wherein the user activity is comprised of a remote start command received from the user of the vehicle.

5. The apparatus of claim 1 wherein the biometric device is comprised of a camera configured to capture an image of the user approaching the vehicle, wherein the set of rules further comprises leaving the heating device inactivated if the camera captures a test image showing that the camera is not obstructed by ice or snow.

6. The apparatus of claim 5 further comprising the step of activating the heating device in response to a user activity if the test image shows that the camera is obstructed by ice or snow.

7. The apparatus of claim 1 wherein the biometric device allows access to the user of the vehicle by verifying a fingerprint of the user.

8. The apparatus of claim 1 wherein the data acquisition system identifies the area of the vehicle to be combined with weather information to acquire a forecast.

9. The apparatus of claim 1 wherein the data acquisition system identifies the area of the vehicle to estimate a time of return.

10. The apparatus of claim 1 further comprising a power manager configured to inactivate the heating device when an energy reserve falls below a second threshold.

11. The apparatus of claim 1 wherein the set of rules are completed in order from (A) through (D) and progress through the rules is terminated when any one of the rules leaves the heating device inactivated.

12. A method for autonomously triggering a heating device proximate to a biometric device mounted on a vehicle comprising:

(A) collecting baseline data including a parking status, an ambient exterior temperature, and a weather forecast, when the vehicle enters a key-off state;
(B) setting the heating device as inactive if the parking status is identified as indoor;
(C) if not already set as inactive then setting the heating device as inactive if the ambient exterior temperature is above a predetermined threshold;
(D) if not already set as inactive then setting the heating device as inactive if the weather forecast indicates a probability of snow or ice less than a threshold;
wherein the method is completed in order from (A) through (D) and progress through the method is terminated when any one of (B) through (D) sets the heating device as inactive; and
(E) activating the heating device in response to a user activity if the heating device has not been set as inactive in (B) through (D).

13. The method of claim 12 wherein the user activity is comprised of an estimated time at which a user of the vehicle is expected to access the vehicle.

14. The method of claim 12 wherein the user activity is comprised of a security key of the user approaching within a threshold distance of the vehicle.

15. The method of claim 12 wherein the user activity is comprised of a remote start command received from the user of the vehicle.

16. The method of claim 12 wherein the biometric device is comprised of a camera configured to capture an image of the user approaching the vehicle, wherein the heating device is set as inactive if the camera captures a test image showing that the camera is not obstructed by ice or snow.

17. The method of claim 13 wherein the biometric device allows access to the user of the vehicle by verifying a fingerprint of the user.

18. The method of claim 12 further comprising a power manager configured to set the heating device as inactive when an energy reserve falls below a threshold.

19. The method of claim 12 further comprising inactivating a data acquisition system when an energy reserve falls below a threshold.

* * * * *